United States Patent [19]
Tinti et al.

[11] Patent Number: 5,771,093
[45] Date of Patent: Jun. 23, 1998

[54] MOUNTING PLATFORM FOR OPTICAL SYSTEM

[75] Inventors: Robert Tinti, Lakewood; James M. Zamel, Hermosa Beach, both of Calif.

[73] Assignee: TRW Inc., Redondo Beach, Calif.

[21] Appl. No.: 799,078

[22] Filed: Feb. 11, 1997

[51] Int. Cl.⁶ .................................................. G01N 21/01
[52] U.S. Cl. ........................... 356/244; 248/637; 428/116
[53] Field of Search ..................................... 356/244, 246, 356/440; 248/573, 583, 610, 619, 631; 73/571, 663

[56] References Cited

U.S. PATENT DOCUMENTS

| | | | |
|---|---|---|---|
| 4,360,184 | 11/1982 | Reid, III | 248/573 |
| 4,402,482 | 9/1983 | Harbaugh et al. | 248/466 |
| 4,645,171 | 2/1987 | Heide | 248/637 |
| 4,690,507 | 9/1987 | Zimmerman | 350/321 |
| 4,735,089 | 4/1988 | Baker et al. | 73/663 |
| 4,972,258 | 11/1990 | Wolf et al. | 358/93 |
| 5,061,541 | 10/1991 | Gertel | 428/116 |
| 5,154,963 | 10/1992 | Terry | 428/116 |
| 5,402,734 | 4/1995 | Galpin et al. | 108/28 |
| 5,433,302 | 7/1995 | Heide | 188/378 |
| 5,460,865 | 10/1995 | Tsotsis | 428/116 |
| 5,500,269 | 3/1996 | Terry | 428/116 |
| 5,517,857 | 5/1996 | Hobbs | 73/571 |

*Primary Examiner*—Hoa Q. Pham
*Attorney, Agent, or Firm*—Michael S. Yatsko

[57] ABSTRACT

There is provided an improved mounting platform for supporting an optical system required to be precisely aligned. Alignment is required to focus a high-power laser beam on a target in a temperature variable environment that introduces thermal stresses affecting alignment. The platform 30 is a honeycomb structure comprising a core 50 sandwiched between a top plate 52 and bottom plate 54. A high-power laser optical system 12 is mounted on the top plate 52 of the platform 30. The metal enclosure 32 having top and bottom walls 34 and 36 and side walls 38, 40, 42 and 44 respectively encloses the platform 30. The platform 30 is secured to a base table 60 by means of one or more anchor assemblies 62. They are affixed to the bottom plate 54. The anchor assemblies include resilient flexure rings 70 that are received in apertures 64 cut in the bottom wall 36 of the enclosure 32. This permits movement of the enclosure due to portions of it undergoing expansion or contraction as a result of the scattering of laser energy inside the enclosure. The anchors isolate top plate 52 against movement of the enclosure. The inside walls of the enclosure are treated to preferentially absorb the radiant energy and the platform 30 is constructed of highly reflective materials to reduce absorption of the radiation.

13 Claims, 2 Drawing Sheets

MOUNTING PLATFORM FOR OPTICAL SYSTEM

BACKGROUND

This invention relates generally to platform structures for mounting highly-sensitive optical systems that assure very precise alignment and, more particularly, to mounting platforms for high-power laser optical systems that are stabilized against thermally-induced displacement.

DISCUSSION

Industrial use of lasers for a variety of precision manufacturing operations such as hole drilling, welding and cutting requires that the laser-generating medium and the associated optical components be maintained in precise alignment with the work. Known industrial operations use high-power lasers to produce micron-sized drill holes and performing welding operations on microchips. The alignment tolerances for many of these applications is usually measured in microradians.

The use of honeycomb type mounting platforms for supporting highly-sensitive optical equipment is well-known. The honeycomb structures are usually used in areas where a lightweight, high stiffness vibration-free surface is required. The typical construction of the honeycomb tabletop comprises a top plate and a bottom plate with a honeycomb or web structure bonded in between. The structures are known to be quite stiff when exposed to compressive loads applied normal to the top plate of the platform and it provides a rigid separation between the plates. They are known, however, to be less rigid when exposed to laterally-applied forces. Such known platforms may have utility for insulating an optical system against vibration however, the more sensitive applications to which optical tables are put are those involving interferometry, where tolerable relative displacements of the reflective elements are measured in microns and the allowable tabletop bending or twisting is much less than a second of arc. The rigidity of a panel or table used in research is one of primary performance features and, for a given panel thickness in skin, it depends largely on the shear modulous of the honeycomb core. For these and related reasons, honeycomb cores are generally preferred as a starting point but require significant modification in order to be useful for the more sensitive applications.

The problem addressed by this invention is to maintain a stable platform for very sensitive optical apparatus that is housed in a metal enclosure and generates a considerable amount of heat. The concern is not to protect against vibrations but to deal with the considerable amount of heat that may be generated such as from a high-power laser optical system. In the environment of the optical systems with which this invention is concerned requires limiting variations or displacements not to exceed 30 to 50 microradians. It is the thermal stresses that are introduced by the heat generated by the high-power lasers that could result in such displacements if not appropriately controlled.

The precision controls afforded by the prior art involve rather complex mechanisms. Worthy of discussion is U.S. Pat. No. 4,360,184, which involves a pressurized pneumatic piston which attenuates and dampens vertical and horizontal forces and combinations of the same caused by vibration. One of the disadvantages of such a system in attempting to control very precisely the alignment of an optical system besides its complexity and cost is its slow response. Understandably, in carrying out a very precise hole-drilling operation, it is essential that the means for controlling displacement respond almost instantaneously.

The problem addressed by this invention is to maintain a stable platform for such very sensitive optical apparatus that generates a considerable amount of heat particularly when a high-power laser is involved. Typically, there is a good deal of heat that escapes from the system and is readily absorbed by adjacent structure including the platform itself so that there are introduced thermal stresses which can readily cause displacement in excess of acceptable tolerances for maintaining alignment.

SUMMARY OF THE INVENTION

This invention provides a rigidly stable platform for supporting an optical system in precise optical alignment to accurately focus a beam on a given target, said optical system being capable of generating heat, some of which escapes from the system into the surrounding platform causing thermal stresses in the form of expansion and contraction of the materials. The optical platform with the high-power laser optical system mounted thereon is contained in a walled metal enclosure which is equipped with apertures in the bottom wall and which preferentially absorbs the thermal radiation causing the enclosure to undergo dimensional changes. There is provided a series of anchor assemblies for isolating said optical platform against the thermal disturbances comprising a pedestal and having a top face and an under face and a depending threaded leg portion with the top face being affixed to the bottom plate of the honeycomb platform. The depending leg is secured to a base table. Encircling the depending leg portion adjacent the underside face of the pedestal is a resilient flexure circumferentially grooved ring that is mounted within the apertures on the bottom wall of the enclosure. The resilient flexure ring is formed with a radially-extending groove that partially cuts into the ring at a line axially mid-way its thickness.

Means are provided for mounting the enclosure on the anchor assembly by receiving the anchor assemblies into each of the apertures formed in the bottom wall of the enclosure. The apertures are received in the radial grooves formed in the resilient flexure ring. The resilient flexure ring encircling the depending leg of the pedestal is urged in abutment with the under face of the pedestal by a washer held in place by means of a threaded nut.

In the preferred embodiment, a series of three anchor assemblies are deployed in a triangular geometry and are fixed to the base table by means of a threaded bolt. The threaded bolt is fixtured through the bottom plate of the platform being threadably received by the pedestal.

The invention provides for controlling the emissivity of the surrounding environment in which the heat is generated. The top plate of the platform is rendered highly reflective by providing a highly polished surface such as stainless steel to reflect the radiation and the inside walls of the enclosure are painted black to preferentially absorb the radiation.

DRAWINGS

DETAILED DESCRIPTION

Figure 1:
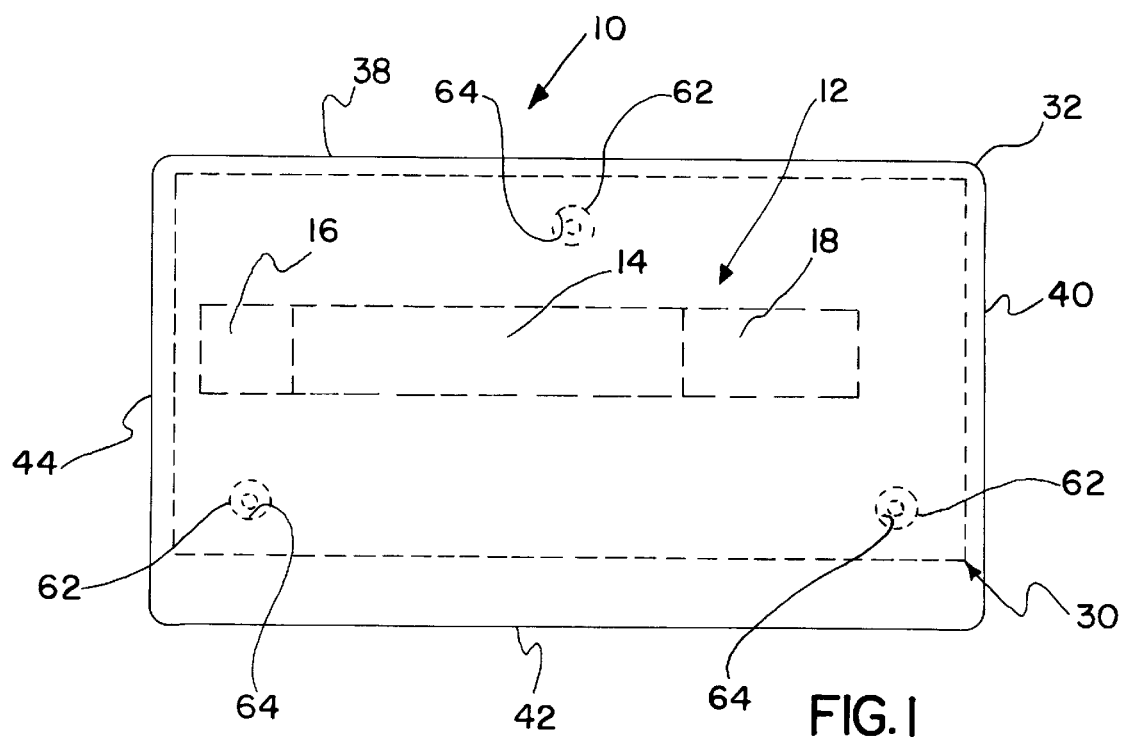
FIG. 1 is a top view of the optical support platform of this invention contained in the enclosure.
Figure 2:
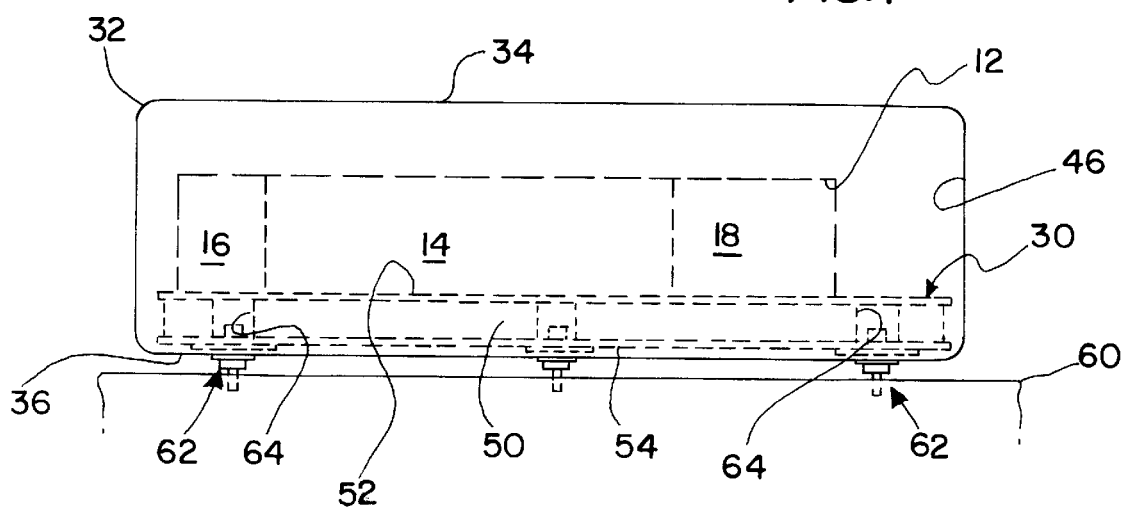
FIG. 2 is a side elevation view of the optical support platform of FIG. 1.

Referring to FIGS. 1 and 2, there is shown the top view of the support platform for a precision optical system identified generally by the reference numeral 10. The precision optical system for the purpose of this description is a high-powered laser unit (HLU) shown in outline form identified generally with the reference numeral 12. The HLU typically comprises a laser gain module 14, a pathway 16 comprising lenses and reflective surfaces and a telescope 18. The HLU is mounted on a supporting platform identified generally with the numeral 30. The platform 30 is encased in a metal enclosure 32 having a top, bottom and side walls 34, 36, 38, 40, 42 and 44, and an inside surface 46 which is painted black to increase its emissivity so that it preferentially absorbs the heat scattered by the HLU.

The platform 30 is a well-known honeycomb structure formed of a honeycomb core 50 sandwiched between a top plate 52 and a bottom plate 54.

The platform 30 is secured to a base table 60 by means of a series of anchor assemblies 62. The base table desirably is a rigid, sturdy construction made of stone or heavy gauge metal which is generally employed when supporting sensitive optical instruments against vibrations. It will be understood that the base table 60 does not necessarily contribute to the objectives of this invention. The anchors 62 are attached to the bottom plate 54 accessible through openings 64 formed in the platform 30. By way of example and not by way of limitation the number of anchor assemblies identified generally by the reference numeral 62 is three, which are arranged in a triangular configuration to the bottom plate 54 of the platform 30. While three anchors are discussed herein, it is anticipated that depending on the size of the optical system that needs to be isolated against the thermal disturbances, a single anchor may perform very well when coupled with "dead anchors" mounted to level the platform 30. If a larger platform area is involved with potentially greater thermal disturbances, it may require more than three anchors.

Figure 3:
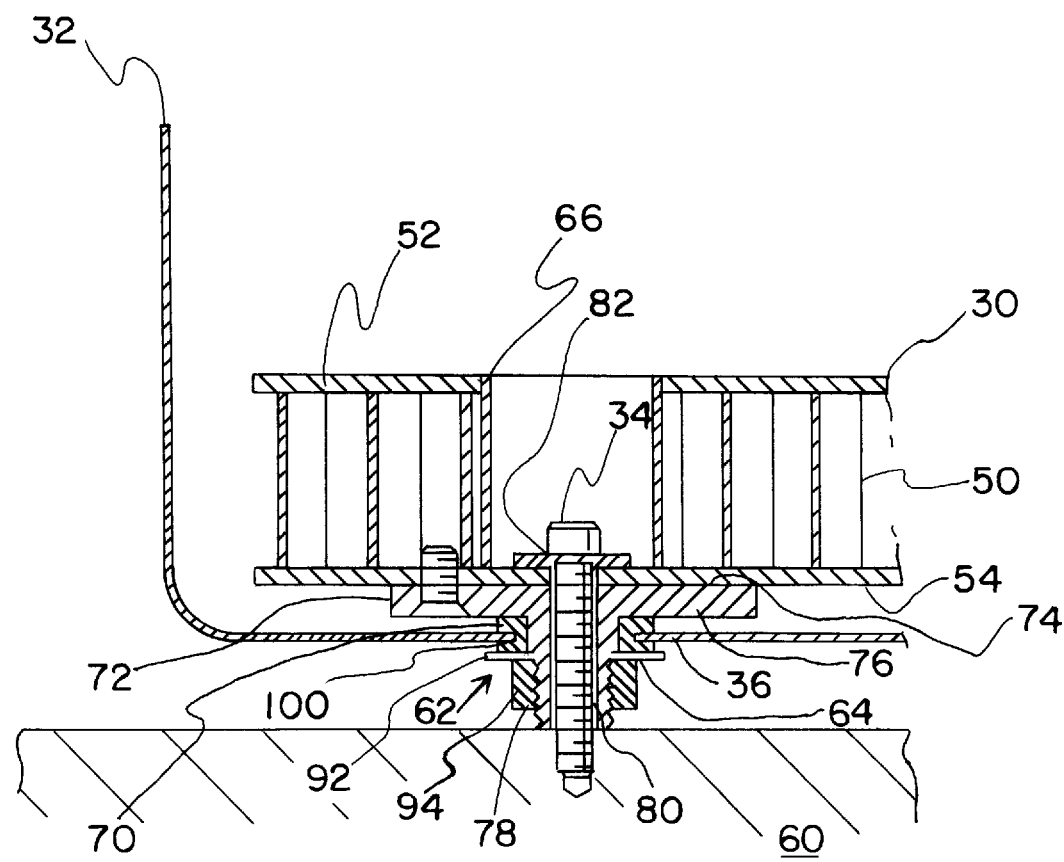
FIG. 3 is a partially cut-away cross-section of FIG. 2 showing the anchor assembly of the optical platform.

Referring to FIG. 3, there is shown the enclosure 32 which is equipped with openings 64 that are positioned in alignment with the openings 66 in the platform 30. The anchor assemblies 62 are constructed in a manner such that any displacement experienced by the plate 54 as contributed by the enclosure 32 will be absorbed in a resilient flexure ring 70 which isolates the plate 52 against such bending or twisting or other distortions.

The anchor 62, in addition to the resilient flexure ring 70 includes a pedestal 72 having a top face 74 and an under face 76 and a threaded depending leg member 78. The pedestal is formed with a central bore 80 which coincides with an opening 82 in the bottom plate 54 and through which is fitted a threaded bolt 84 that is fixed into the base table 60.

Encircling the member 78 is a resilient flexure ring 70 that is urged in abutment with the under face 76 of the pedestal 72 by a washer 92 held in place by the threaded nut 94 that engages the depending leg member 78. The resilient flexure ring 70 is formed with a radially-extending groove 100 that partially cuts into the ring in a line axially mid-way its thickness. The diameter of the openings 64 in the bottom wall 36 of the enclosure is smaller than the diameter of the resilient flexure ring 70 so that the circumferential edges of the openings 64 are received in the groove 100. The thickness of the metal enclosure 32 is slightly larger than the width of the groove 100 so that it is frictionally engaged and captured in place as the nut 94 is tightened against the washer 92. The manner in which the enclosure 32 is mounted on the pedestal 72 by engaging the edges of the openings 64 renders it secure to the resilient flexure 70 thereby permitting different portions of the enclosure to twist and bend without resulting in any displacement of the top plate 52.

An important aspect of the invention is the treatment of the surfaces of the platform 30 and the inside surfaces of the enclosure to control the response to the existing thermal conditions. The surfaces of the plates 52 and 54 are rendered highly reflective using polished stainless steel or other suitable treatment, and the inside surface of the enclosure 32 is painted black so that it is highly absorptive of the radiation and the surfaces of the platform are highly reflective of the heat.

In practice, the high-power optical system 12 will generate high-power electromagnetic beams that typically escape within the system 10 and within the enclosure 32. The highly-reflective surfaces reflect the radiation and the black interior preferentially absorbs the heat radiation. The random scattering of radiation within the enclosure will cause the heat to be absorbed non-uniformly and, therefore, the enclosure will undergo thermal expansion or contraction non-uniformly so that it will tend to bend and twist imposing dimensional stresses on the platform 30. As the enclosure undergoes such irregular distortion, it will be absorbed by one or more of the anchor assemblies 62 thereby insulating the top plate 52 from any displacement preserving the precise alignment of the high-power laser.

The present invention has been described in considerable detail with reference to certain preferred versions thereof; however, other versions are possible. Therefore, the spirit and scope of the appended claims should not be limited to the description of the preferred versions contained in here.

What is claimed is:

1. A platform for supporting an optical system requiring precision alignment and operating in a temperature variable environment in which heat is generated, said platform being subject to expansion and contracting due to temperature variations, said optical system aligned with a predetermined target, said platform comprising a top and bottom plate having a rigid core structure between said platform comprising;

enclosure means enclosing said platform for shielding the optical system against contamination and containing stray radiant energy having top and bottom walls and side walls; anchor means for supporting the enclosure; and a resilient flexure ring disposed on said anchor means between said platform and engaging the bottom wall of said enclosure, whereby the forces of expansion and contraction experienced by the bottom plate of the platform are absorbed by the resilient flexuring decoupling the platform from the enclosure.

2. The platform as claimed in claim 1 wherein the optical system is a high-power laser generated beam that is focused on a predetermined target.

3. The platform as claimed in claim 1 including means for securing the resilient flexure ring between the bottom wall of the enclosure and the bottom plate of the platform.

4. The platform as claimed in claim 1 wherein the bottom wall of the enclosure is apertured having free circumferential edges and the resilient flexure ring is cut with a radially extending groove into which is received the free edges of the aperture.

5. The apparatus as claimed in claim 1 wherein the support structure further comprises a pedestal having an upper and under face, the upper face being in contact with the bottom plate of the honeycomb structure and a depending leg portion that is received in an aperture in the bottom wall of the enclosure, and a washer in contact with the under face;

a resilient flexure element extending below the bottom wall opening of the enclosure and receiving the depending leg portion of the pedestal extending beneath the bottom wall opening.

6. The apparatus as claimed in claim 5 wherein the inside walls of the enclosure are treated to absorb the heat.

7. The apparatus as claimed in claim 5 wherein the honeycomb structure is treated to be highly reflective of heat.

8. The apparatus as claimed in claim 1 further comprising fastener means for securing said pedestal and said washer in place within the enclosure bottom wall aperture and the bottom plate of the platform, whereby changes in the dimension of the optical platform due to thermal effects is absorbed in the support structure maintaining its alignment.

9. An apparatus adapted to maintain precise alignment of an optical system on a target in a temperature variable environment, said apparatus comprising:

an optical platform on which is mounted an optical system comprising:
  a honeycomb structure sandwiched between top and bottom metal plates,
  said honeycomb structure exhibiting stiffness when applied a compressive force in a direction normal to the top plate and movable when applied lateral forces parallel to the top and bottom plates,
  said bottom plate having an opening therein;
enclosure means enclosing the optical platform for shielding the optical system against heat, contamination and containing stray radiation having top and bottom walls and side walls,
anchor means for receiving said optical platform and said enclosure and insulating the enclosed apparatus against the thermal expansion or contraction of the optical platform, said anchor means comprising:
  a resilient flexure ring disposed between the bottom wall of the enclosure and the bottom plate of the optical platform, said resilient flexure ring being received within and supporting the bottom wall of the enclosure;
  whereby movement generated by the dimensional changes in the bottom wall of the enclosure is absorbed by the resilient flexure ring decoupling the enclosure from the optical platform maintaining the alignment of the optical system.

10. An apparatus adapted to accurately maintain the alignment of an optical system on a target in a temperature variable environment, said apparatus comprising:

an optical platform on which is mounted an optical system comprising:
  a honeycomb structure sandwiched between top and bottom metal plates,
  an enclosure containing the platform having bottom and top walls and side walls and an aperture having free edge portions formed in the bottom wall,
  a support structure for receiving said optical platform and said enclosure and isolating the enclosed apparatus against the thermal expansion or contraction of the optical platform, said support structure comprising:
    a pedestal having a depending threaded leg portion;
    a resilient flexure ring surrounding the leg portion and being urged against the under side of said pedestal, said resilient flexure ring having a radially extending groove cut partway into the resilient flexure ring and the free edge portions of the apertures received in said groove whereby the optical platform is decoupled from the enclosure.

11. An apparatus adapted to accurately maintain the alignment of an optical system on a target in a temperature variable environment, said apparatus comprising;

a base table;

an optical platform on which is mounted an optical system comprising:
  a honeycomb structure sandwiched between top and bottom metal plates,
  enclosure means for shielding the optical system against heat, contamination and containing stray radiation having top and bottom walls and side walls and apertures in the bottom walls with free edges,
  a support structure for receiving said optical platform and said enclosure and isolating the optical platform against the thermal expansion or contraction of the optical platform, said support structure comprising:
    a pedestal having an upper face that is in contact with the bottom plate of the honeycomb structure, and an under face and a depending leg portion that is received in an aperture in the bottom wall of the enclosure;
    a resilient flexure ring encircling the leg portion into which is received the free edges of the bottom wall apertures;
    a washer in contact with the resilient flexure ring urging the resilient flexure ring against the under face of the pedestal, whereby changes in the dimension of the optical platform due to thermal stresses is absorbed in the resilient flexure ring maintaining its alignment.

12. The apparatus as claimed in claim 11 further comprising fastener means for securing said pedestal and said washer in place within the enclosure bottom wall aperture and the bottom plate of the platform.

13. The apparatus as claimed in claim 11 wherein the honeycomb structure is treated to be highly reflective of heat.

* * * * *